Clarence W. Brandon
INVENTOR.

Nov. 30, 1965 C. W. BRANDON 3,220,475
METHOD FOR FLUID PRESSURE FRACTURING OF
FORMATION AND FLUID RECOVERY THEREFROM
Original Filed Aug. 5, 1959 4 Sheets-Sheet 3

Clarence W. Brandon
INVENTOR.

BY *Head & Johnson*

Attorneys

Clarence W. Brandon
INVENTOR.

United States Patent Office 3,220,475
Patented Nov. 30, 1965

3,220,475
METHOD FOR FLUID PRESSURE FRACTURING OF FORMATION AND FLUID RECOVERY THEREFROM
Clarence W. Brandon, Tallahassee, Fla., assignor of five percent to Harvey B. Jacobson, Washington, D.C., twelve and one-half percent to Orpha B. Brandon, Tallahassee, Fla., and fifty percent to Nat A. Hardin, Catherine H. Newton, and Hazel H. Wright, jointly, all of Forsyth, Ga.
Continuation of application Ser. No. 832,882, Aug. 5, 1959. This application Oct. 11, 1963, Ser. No. 315,548
15 Claims. (Cl. 166—42)

This invention comprises novel and useful improvements in methods for fluid pressure fracturing of formations and fluid recovery therefrom, and more specifically pertains to a method for recovering oil from oil bearing formations and especially for the secondary recovery of oil therefrom, and constitutes a continuing application of co-pending application Serial No. 832,882, filed August 5, 1959, now abandoned, which is a continuation-in-part of applications Serial No. 490,482, filed February 25, 1955, now abandoned and Serial No. 491,715 filed March 2, 1955, now abandoned.

In certain subterranean geological formations from which it is desired to recover valuable fluids in the form of gases, liquids or both, it frequently happens that the formation is of such a nature that the interstices or pore spaces of the formation are of so small a diameter that the free flow of fluid therein is precluded. A typical example of such formations is the quartz type of oil sand of an oil bearing formation in which the pore space is so small as to constitute a capillary lock for the fluid therein. In such types of formation, the recovery of fluid therefrom is usually very slow and is a costly and time consuming operation, frequently necessitating the employment of such secondary recovery methods as gas or water drives, as well as various types of fracturing processes.

The most commonly employed fracturing process, which is intended to sufficiently fracture the fluid producing formation so as to facilitate the drainage of fluid and the recovery of fluid therefrom, is to introduce a fluid into predetermined zones of permeability of the productive formation from a well bore and then either apply pressure to said fluid or expand the fluid whereby to open up or create fissures in the formation. As will be readily apparent, such methods, at best, merely produce fissures in a single horizontal plane in the formation which radiate from the well bore. Usually, however, such fissures do not extend through the entire vertical height or depth of the formation, and thus, only a portion of the fluid stored in the formation can be effectively recovered by such methods.

In many such prior conventional methods, the fracturing fluid being directly applied to the formation to be fractured, is frequently released and lost into permeable regions when the formation begins to fracture, thus preventing complete fracturing of the formation. To overcome this fatal defect in such methods, relatively expensive and time consuming multi-fracturing is necessary throughout the productive formation.

The primary aim of this invention is to secure a fracturing of the fluid bearing formation from which it is desired to recover a valuable fluid, in such a manner that the formation may be completely broken, and if desired, in a single fracturing operation, from top to bottom thereof by vertical fissures or crevices which extend radially from the well bore, whereby substantially all of the fluid content of that portion of the formation to which the method of this invention is applied may be effectively recovered.

Another very important purpose is to provide a method for fracturing a productive formation wherein the fracturing method may be performed without contamination of the formation by the fracturing fluid; and without loss of fluid from the formation.

Yet another very important object is to provide a method as set forth above, wherein the fracturing fluid need not be released or recovered before producing from the formation; and may be retained in readiness for further fracturing or treatment.

Further specific objects of this invention are to provide methods whereby fracturing pressures may be applied to a fluid containing formation for the recovery of fluids therefrom in improved modes such that the area or zone of the formation being fractured may be more accurately controlled than has been heretofore possible and thereby cause more complete and effective fracturing of the formation from top to bottom. In some of the methods herein disclosed a formation may be disrupted or fractured during the process of recovering fluid therefrom and without interrupting such fluid recovery; and wherein selected portions of a formation may be successively fractured as desired.

Additional objects are to provide methods whereby productive formations may be fractured and displaced by applying pressure to adjacent elastic strata; and whereby displacement of such elastic strata may be continued or varied, during the use of several of the methods taught herein, while producing from the productive formation.

Another object is to provide a method in accordance with the foregoing objects whereby gravity drainage may be employed for a fractured formation and may be continued after the productive pressure initially present in the productive formation has been dissipated.

Yet another purpose is to devise a method for more completely fracturing a productive formation by applying a fracturing force to the underside of the formation for partially fracturing the same and by utilizing the weight of the over-burden to subsequently apply a fracturing force to the upper side of the formation to complete the fracturing thereof.

Further specific and important objects of the invention are to provide a fracturing process for the recovery of fluids from geological formations which may be performed in conjunction with conventional methods of fluid recovery and flow acceleration from oil bearing and other formations.

These, together with other objects and advantages which will become subsequently apparent, reside in the details of construction and operation as more fully hereinafter described and claimed, reference being had to the accompanying drawings forming a part hereof, wherein like numerals refer to like parts throughout, and in which:

Certain geological formations from which valuable fluids are to be recovered, such as petroleum bearing oil sands of the quartz type, are characterized by extreme hardness and brittleness. Such formations are substantially nondeformable under pressure, and consequently, when subjected to pressures, may be crushed in much the same manner as a pane of glass. Frequently, such brittle strata are juxtaposed to a deformable formation on the top, or bottom sides, or both, such as limestone, shale and the like. These deformable formations, under the pressures and temperatures, may be bent or deformed to a considerable extent before fracture occurs therein.

Although the present invention is not limited thereto, it is specifically applicable to such formations to effect a more efficient and a more economical recovery of fluids from a fluid bearing strata of a brittle type. In the accompanying drawings, there has been diagrammatically illustrated a number of modes of applying the fundamental concept of this invention in geological formations of the character above referred to, and the accompanying specification describes satisfactory modes of practicing the methods involved.

Generally, as taught and defined herein, this invention provides a method of fracturing oil and gas productive formations which are contiguous or adjacent relatively deformable strata, the formations being of ultimate strength characteristics less than the deformable strata. That is, the method broadly involves utilizing the deformable strata to fracture the productive formation.

Figure 1:
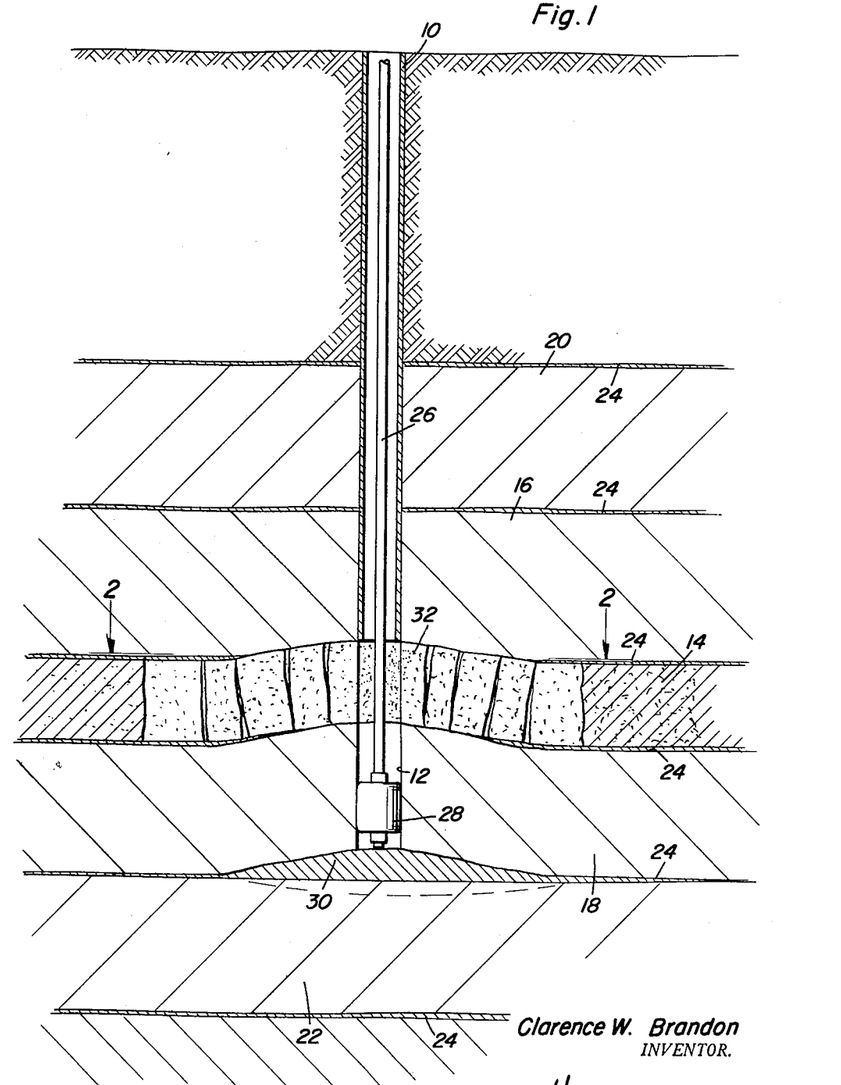
FIGURE 1 is a diagrammatic view illustrating in vertical section a portion of a subterranean formation with a well bore therein and illustrating a simple method applying a basic concept and principle of this invention thereto, and is taken substantially upon the plane indicated by the section line 1—1 of FIGURE 2.
Figure 2:
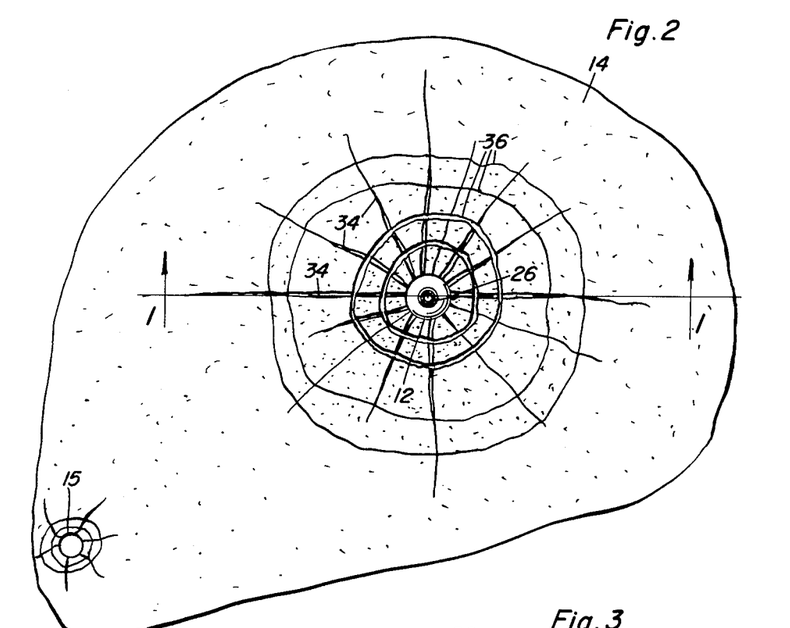
FIGURE 2 is a horizontal sectional view taken substantially upon the plane indicated by section line 2—2 of FIGURE 1.

Method of FIGURES 1 and 2

In FIGURE 1, there is disclosed a well casing 10 which is applied in a well bore 12 in a geological formation. The well bore extends through the hard, brittle fluid producing formation, such as a quartz oil bearing strata 14. Shown at 16 is an overlying deformable formation, such as limestone, shale or the like, while at 18 is disclosed an underlying deformable formation of a similar character, 20 and 22 designate further deformable formations above and below the productive strata 14. Indicated at 24 are the interfaces between successive layers of the geological formation, these interfaces usually being shale or clay, as is well known.

However, these interfaces 24, as defined hereinafter in the specification and the claims, are not limited to those natural boundaries existing between successive layers of the geological formation, but may include those boundaries caused to exist by induced splits or fractures caused to happen by any of the presently well known formation rupturing methods, within any of the layers of the deformable formation or formations adjacent the productive formation 14. The determining factor for use of the following methods being that there be a portion of substantially deformable strata between the natural of induced interface and the productive strata or formation 14.

The method of applying the principles of this invention to such a formation as shown in FIGURE 1, in a substantially exaggerated illustration, is as follows:

The casing 10 of the well bore is, of course, terminated at the top of the productive strata 14 in accordance with conventional practice, the bore 12 being continued below the strata and preferably below the immediately adjacent underlying deformable formation 18, and into the interface 24 between the strata 18 and the successive underlying strata 22.

A string of piping 26 is positioned in the well bore 12, and a conventional packer 28 is employed in the lower portion of the bore 12 at the bottom of the deformable formation 18 and at the interface 24 thereof. A suitable fluid medium under pressure, which is preferably liquid, but may be gaseous in nature if desired, is supplied through the string of piping 26 to the interface 24 below the strata 18 and is forced into this interface. Under the pressure supplied, the deformable strata 18 is forced or lifted upwardly, the pressure fluid being disposed in a pressure chamber or space 30 which is thus formed in the interface 24 between the formation strata 18 and 22. The upward deformation of the strata 18 in turn forces the superincumbent portion of the brittle strata 14 upwardly. Since the strata 14 is not deformable, the pressure applied thereto causes an upward movement producing fractures through this strata and the fractured portion of the strata is then likewise forced upwardly, as indicated by the portion 32 in FIGURE 1, being forced upwardly into the deformable lower portion of the strata 16.

When a brittle, hard plate-like material, such as a plate of glass or a quartz sand strata 14, has a pressure applied to a point thereon, the material shatters or fractures with a series of vertical crevices or fractures 34 opening radially from the point at which the pressure is applied, this being the well bore in the situation illustrated in FIGURES 1 and 2.

At the same time, such shattering or fracturing is accompanied by one or more circular vertical fractures 36 which are generally concentric with the center of the pressure, as shown in FIGURE 2.

It is to be particularly noted that by reason of the vertical lifting of the layer 14, the fractures 34 and 36 would extend throughout the entire vertical height or depth of the layer. Thus that portion of the layer subjected to the fracturing force applied below the packer 28 and below the deformable strata 18 by the string of piping 26, will be thoroughly broken into relatively small pieces, and a number of crevices and passages will be opened extending from the top to the bottom of the productive strata and throughout various portions of the same. Any fluids within the productive strata and which would otherwise be retained thereby by virtue of the small sizes of the pores or passages of the formation will now freely be liberated and may be recovered in any desired conventional manner. Usually, these fluids are recovered and educted either by flowing or by pumping from the interior of the casing 10. Since the operation of this method is not dependent upon any particular mode of recovery of the fluids released from the formation by the fracturing of the same, illustrations and further description as to the recovery of the fluids is deemed unnecessary.

It will be, of course, apparent that the reverse of the method illustrated in FIGURE 1 may be employed, and the force for fracturing the formation may be applied above the same for fracturing the formation by downwardly applied force. In such instances, the casing 10 would be ended within strata 20, just above interface 24, packer 28 would be moved up within strata 16, and the fluid pressure would be applied through casing 10 into interface 24 thus forcing the strata 16 downwardly upon the frangible strata 14 for bowing the latter downwardly and for fracturing the same in the manner above described. Naturally, in this method of downwardly fracturing strata 14, production of the formation fluids would be through piping 26.

In the method set forth hereinbefore for practising the principles of this invention, it will be observed that a fluid pressure, either liquid or gaseous, is applied to a deformable formation which is adjacent to a brittle frangible strata which it is desired to fracture, and the deformable formation is caused to press against the strata for thus shattering the same.

A basic feature of this invention resides in the use of a relatively deformable strata as a diaphragm interposed between the fluid pressure fracturing and manipulating force and the treating forces are operatively applied to the strata being treated, direct contact of the treating force medium therewith is prevented.

A number of novel and extremely important advantages arise from this feature. First, there is offered a precision of control of the fracturing process which is not possible in conventional fracturing methods. Since in this method, the pressure fluid need never contact nor penetrate the productive strata, the production from the latter need not be halted to permit operation of the fracturing process. Therefore, the effectiveness of the fracturing operation may be visually ascertained from inspection of the flow from the productive strata and appropriate changes, as desired, may be immediately made in the application of the fracturing pressure. In conventional methods of fracturing, the fracturing fluid is directly applied to and therefore penetrates the productive strata. This fracturing fluid must be removed before production can be resumed and therefore before the effectiveness of the fracturing operation can be evaluated and corresponding adjustment of the fracturing operation effected. This method therefore saves times and affords a very precise and sensitive control of the fracturing operation.

Second, contamination of the productive strata by the fracturing pressure fluid is completely avoided since the latter need not directly contact the productive strata. In conventional fracturing processes, since the fracturing fluid is directly applied to the productive strata, the fracturing fluid enters the strata as soon as the fracturing of the latter begins. Often, this results in damage to the productivity of the strata and often requires time consuming and expensive operations to correct the detrimental effects upon the same. All this is completely avoided by this method.

Third, there is no loss of fluid pressure or of the pressure fluid, in this method, upon fracturing of the productive strata. In conventional methods, the beginning of the fracturing allows escape of the pressure fluid and also loss of the pressure applied to the formation. Often, this necessitates the starting of one or more additional, new fracturing operations in order to obtain complete fracturing of the strata. In the present method, a simple operation may be temporarily halted and then continued as often as desired until the entire fracturing operation is completed.

Fourth, the present process enables the fracturing of a strata to be accompanied by or subsequently followed by a physical displacement of the strata as part of a single operational procedure, this facilitating recovery of the fluids from the strata. This is obviously impossible in present conventional fracturing methods.

Fifth, in the use of the present method, the height or vertical thickness of the productive zone is of no consequence. In such formations as the Spraberry sands in West Texas, production strata thicknesses of 300 feet are not uncommon. By the conventional methods of fracturing, owing to the effect of increasing porosity caused by cracks and cavities originating or formed in the strata upon the flow of fracturing fluid into the strata, the quantity of the fracturing fluid required for complete fracturing obviously varies with the thickness of the formation. In this method, however, since the diaphragm or sealing action of the deformable layer prevents loss of fluid into the strata, no more fluid is required to completely fracture a 300 foot strata than that required for an approximately 20 foot strata of the Bartlesville sand of Northern Oklahoma and Kansas. In fact, the thicker strata tends to fracture more completely than the thinner strata under this method. An enormous saving in the time and expense for fracturing thick strata is obtainable under the present invention.

The fracturing process of this method further lends itself admirably to use with fluid drives for the secondary recovery of fluids from a productive strata. As shown in FIGURE 2, one or more well bores 15 may be employed as sources for fluid pressure drives upon the fluids in the productive strata 14, the driving fluid being applied from the well or wells 15 into the strata 14 for driving fluids towards the bore 12. Conversely, the reverse drive may be employed. In this phase of the invention, the formation 14 adjacent the drive wells 15 is fractured in the same manner as that illustrated and described in connection with FIGURE 1. Since the same apparatus and technique may be employed, a description or illustration of the same has been omitted as being merely repetitive.

However, since the strata at the bores 15 is fractured or opened from top to bottom, the drive fluid is able to fill the entire volume of the same and thereby drive all of the strata fluids to the producing well 12. In contrast, in conventional methods of pressure drives, the driving fluid travels in channels which cover only fractions of the total area or volume of the strata. Further, the pressure which may be applied to the adjacent deformable strata 16 and 18 enables the drive fluid to be confined, without loss or escape, to the productive strata.

It should be particularly noted that in this method, fractures are produced which extend vertically from the top to the bottom of the brittle frangible formation which is to be shattered, and these fractures radiate outwardly from the well bore in the formation. It will also be observed that since the shattering force may be applied below the productive formation and will shatter the same by an uplifting pressure applied thereto, that there will be no interruption to the continued flowing of a well from that productive strata. This invention, therefore, provides a method whereby substantially complete recovery of all of the fluids in a formation may be had by a complete fracturing of the formation from the top to the bottom thereof, and substantially uniformly throughout the entire area of the producing formation being treated, and this without interrupting flow from the formation.

However, it should be noted that the diagrammatic drawing of pressure fluid chamber 30 as shown in this FIGURE 1 represents this pressure chamber as it would be should the formation strata 22 be of a substantially non-deformable type and this strata 22 be also resting upon yet lower strata of massive nature or other nonyielding and non-deformable characteristics. Should this strata 22, below interface 24 wherein the pressure chamber 30 is built up, be of a yielding or deformable nature, then it is to be realized that deformation of this strata 22 will occur from the influence of the pressure fluid applied into the interface 24 between strata 18 and 22. It should be considered, however, that such a deformation of lower strata 22 as shown by the dotted line below chamber 30, will in no way deter in the operational success of the method of fracturing shown in this invention, for displacement downwardly of deformable strata, as shown by the dotted line below chamber 30, will cause a displacement of this deformed strata upwardly against interface 24 between strata 22 and 18, as a pressure ring just beyond the limits of chamber 30, where it will be an augmenting pressure means for assisting pressure fluid chamber 30 in fracturing of the productive brittle and frangible strata 14.

Wherein the reverse of the method diagrammatically illustrated in FIGURE 1 is employed, and the force for fracturing the formation is applied above the same for fracturing the formation by a downwardly applied force, then the same condition may exist in the downwardly applied force, as is explained in detail, as above to the upwardly applied force. That is to say, that when the pressure fluid chamber 30 is caused to be applied in the interface 24 between strata 16 and 20, then if strata 20 is of a deformable nature it will be deformed in a similar manner as would strata 22 if it was deformable. However, should strata 20 be overlaid with massive substantially non-deformable strata, then this yielding or deforming of strata 20 would be an augmenting factor in the pressure fracturing of productive strata 14 by the downwardly exerted pressure force of chamber 30 applied between strata 16 and 20.

So far as is known to me, there is no prior method for fracturing a formation now available which will, in a single operation, fracture the producing formation from the top to the bottom thereof; and/or will fracture the formation while in no way interfering with the continuing process of producing fluid from that formation.

Figure 3:
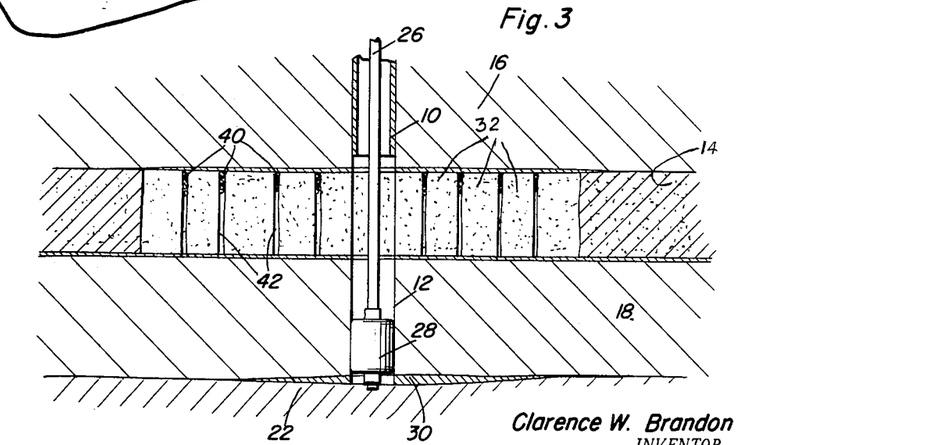
FIGURE 3 is a fragmentary view similar to FIGURE 1 and showing the manner in which the formation after the treatment in accordance with FIGURE 1 has sealing material, sand or gravel introduced thereto and is further fractured under the pressure of the overburden.

Method of FIGURE 3

FIGURE 3 discloses a portion of the same type of formation illustrated in FIGURE 1. It will be observed that when the fractured portion 32 of the strata 14 is uplifted by the pressure applied from therebelow, at least a portion of the crevices 34 and 36 (see FIGURE 2) will be substantially V-shaped, being wider at the top than at the bottom upon that portion of the formation which is radially expanded. In order to augment the fracturing effect and the completeness of the fracture of the formation strata 14, it is considered that gravel or sand may be applied to the top of the portion 40 of the fractured portion 32 of the formation strata 14 in any conventional manner from the lower end of the casing 10. The solid particles of gravel or sand will enter the upper portions of the crevices, as indicated at 40 in FIGURE 3, and also will travel radially therein from the well bore.

After the sanding or graveling operation has been completed, the pressure supplied by the string of piping 26 to the underside of the deformable strata 18 may be released, permitting this strata to drop to its original position. Because of the pressure of the superincumbent burden, the uplifted portion 32 of the fractured strata 14 will also drop to its original position. However, during this droping, the wedging action of the sand and gravel 40 will serve to open the vertical and radial crevices from the top to the bottom of the strata, as shown more clearly by the vertically extending passages 42 which as now shown are of substantially equal width from their top to their bottom ends. Thus, the fractures which extend throughout the entire vertical height of the productive strata 14 are enlarged to more effectively permit drainage of the fluids from the strata and the subsequent recovery of the same in any of the conventional manners as above set forth.

It is also to be understood that the sanding or graveling operation may be performed upon the underside of the fractured strata 14 when the latter is fractured and deformed downwardly.

Still further, the application of a lifting or depressing force to the fractured strata 14 with or without successive sanding and graveling operations may be repeated from time to time, as found to be necessary, to effect complete recovery of fluids from the strata.

In some productive strata in which gas occurs in the upper portion with condensate and liquids in the lower portion, it is desirable to retain the pressure of the gas in the strata after fracturing and to prevent its being produced with the liquid. For that purpose, any suitable sealing material, such as conventional lost circulation materials, may be introduced into the upper portion of the fractured strata together with or instead of the above mentioned sand and gravel. The uplifted formation is then lowered whereby the gravel and/or sealing material will be firmly secured in the upper portions of the crevices as shown in FIGURE 3.

It will be understood that the feature of the sealing and/or graveling can be employed in conjunction with any of the other features of the invention disclosed herein.

However, it is to be understood that during the time of the sanding and graveling and/or sealing material placement operation, which is done in a conventional manner, that, naturally, production of formation fluids from productive strata 14 is ceased during this placement operation.

Figure 4:
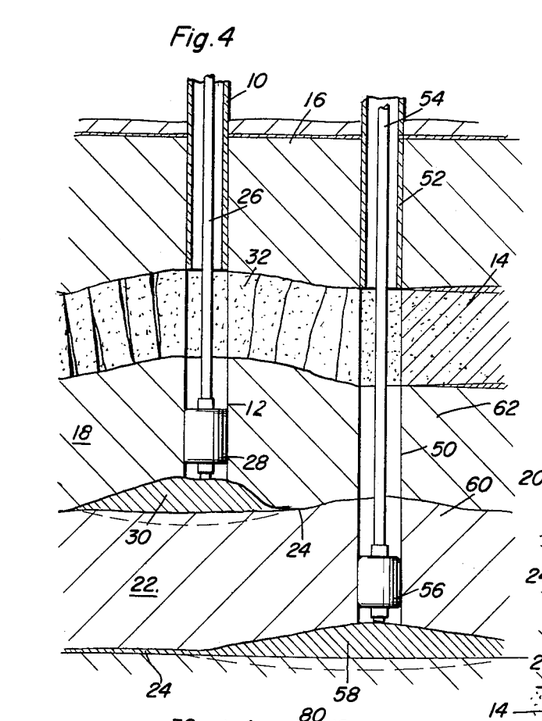
FIGURE 4 is a diagrammatic view similar to FIGURE 1, but showing a manner in which the method of FIGURE 1 may be modified in order to effect a directional control of the fracturing operation of the invention.

Method of Figure 4

In FIGURE 4, there is disclosed a method whereby the fracturing operation may be directionally controlled for fracturing predetermined portions of the productive brittle strata 14. As in the preceding drawings, the same formation is shown, with the casing 10 disposed in the bore 12 and with the string of piping 26 having the packer 28 extending to the interface 24 between the deformable strata 18 and 22 lying directly beneath the productive brittle strata 14, overlying which is the deformable strata 16. It will be understood that if the method of FIGURE 1 were applied to the formation arrangement of FIGURE 4, that the uplifted and fractured portion 32 of the strata 14 would extend about the well bore 12, which is the center of application of the uplifting and fracturing force, at a substantially equal radial distance. In order to limit the application of the uplifting fracturing force applied beneath the packer 28 to the interface 24, a limiting or controlling force is selectively applied. For that purpose, a second, or in some instances, a plurality of appropriately positioned secondary bores 50 are provided at appropriate locations with respect to the previous bores 12, and casings 52 may be applied in these bores or in some instances, may be omitted therefrom, as desired. A further string of piping 54 is inserted in the secondary bore in order to apply a pressure fluid. A suitable packer 56 is likewise applied in the bore 50 at the bottom surface of the deformable zone or strata 22, to the interface 24 therebeneath.

When a fluid under pressure is introduced through the string of piping 54 to the interface 24 beneath the deformable strata 22, a fluid pressure chamber 58 is produced which urges the immediately overlying portion 60 of the strata 22 upwardly. The upwardly bulging portion 60, in turn, forces the immediately overlying portion 62 of the deformable strata 18 upwardly. This upward pressure applied by the portion 60 to the vertically adjacent portion 62 of the strata 18, serves to compress the interface 24 between these stratas 18, 22 and thus seal off or prevent flow of the pressure fluid from the chamber 30 towards the adjacent bore or bores 50.

As will thus be apparent, by properly positioning the bore or bores 50, pressure may be applied therefrom in such a manner as to prevent the chamber 30 from extending in a desired direction, thereby confining the limits of the chamber 30 and consequently, the reach into which the uplifting force is applied to a predetermined area.

It will be understood that the bores 50 may constitute other well bores in a producing geological formation or may be bores drilled for the specific purpose of controlling and directing the application of the force from the string of piping 26 by which the strata 14 is to be fractured.

As in the preceding embodiments, it is, of course, apparent that the reverse arrangement may be applied whereby the uplifting force or the fluid pressure directional control means for the fracturing operation, or both, may be applied upwardly or downwardly in any desired combination.

It is also apparent that the previously described sanding or graveling and sealing operations illustrated in FIG- URE 3 may be likewise applied to the method of FIGURE 4 where desired.

As a further explanation of the operation of this limiting means for pressure directional control of the fracturing operation as taught in this FIGURE 4, the pressure of the pressure fluid applied through piping string 54 to the interface 24, which causes the fluid pressure chamber 58 in well bore or bores 50, is usually maintained below that pressure necessary to cause fracturing of the brittle frangible strata 14 by its upwardly or downwardly exerting pressure fluid force. However, this compressive force exerted on interface 24 between deformable strata 18 and 22, or 16 and 20 where downwardly exerting pressure fluid chambers are used, may cause a considerable pressure differential in the interface 24 between deformable strata 18 and 22, or 16 and 20, for a considerable area surrounding well bore or bores 50, as compared to that pressure still existing at the interface 24 between deformable strata 18 and 22, or 16 and 20, where well bore 10 bisects this interface 24. As is well known by the oil industry, in areas where considerable of these deformable strata exist in geological formations wherein well bores are drilled, as on the Texas and Louisiana Gulf Coast, great care must be maintained in the use of weighted drilling muds so as to prevent the build up of bottom hole pressures of these weighted drilling muds to where the pressure fluids part the interfaces existing in these deformable strata and thus lose the drilling muds off into the formation. A very critical balance often exists in the pressure level at which these interfaces will part and allow deformation of the strata by the inflow of pressure fluid thereinto. Therefore, it may be seen that the pressure differential existing in the formation surrounding well bore or bores 50, as caused to exist by the pressure applied to the formation by pressure fluid chamber 58, may be sufficient to cause the flow of pressure fluid applied to interface 24 through piping string 26, to be in other directions in the formation, rather than into that area pressured by that pressure fluid applied into pressure fluid chamber 58 through piping string 54.

Further, it is to be understood that the diagrammatic drawing of pressure fluid chamber 58 as shown in this FIGURE 4 represents the strata below deformable strata 22 as being substantially non-deformable, then deformation would occur thereinto as shown by the dotted line below chamber 58. There would be a certain amount of deformation of deformable strata 22 below chamber 30, as shown by the dotted line below this chamber 30 of FIGURE 4.

Figure 5:
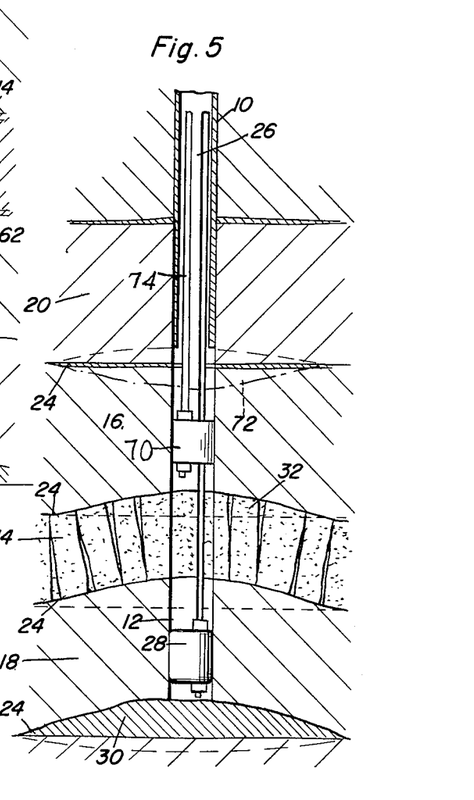
FIGURE 5 is a view similar to FIGURE 1 but showing the manner in which fracturing forces may be applied to both the upper and lower faces of a producing formation.

*Method of Figure 5*

In FIGURE 5 is illustrated a method whereby in addition to the application of a pressure below the deformable strata 18 for applying uplifting and fracturing pressure to the productive strata 14, there may be applied through casing 10, a pressure to the interface 24 between the superincumbent deformable strata 20 and 16 for deforming the strata 16 downwardly, as shown in dotted lines at 72. Where no contamination of the fluids of the productive strata 14 by the pressure fluid applied through casing 10 is desired, then packer 70 and suitable piping string 74 to the surface may be installed within deformable strata 16, so that production of the formation fluids may continue while the fracturing operation is being done or is continued, or to allow the introduction of sand and gravel and/or sealing material to be introduced into the produced fractures or crevices in the productive strata 14 for performing the method earlier discussed in regard to FIGURE 3. It is to be understood, that necessarily, the production of formation fluids through piping 74 will cease while the sanding, graveling and/or formation sealing operations are being consummated, but production of formation fluids may continue as soon as these latter operations are completed and while fracturing of the productive strata 14 continues or is completed. By this means, pressure may be selectively applied either simultaneously or in alternation, both below and above the strata 14 for fracturing the same, and for selectively uplifting or depressing such strata to thereby facilitate complete splintering and fracturing of the strata, and the introduction of sand or gravel and/or sealing material into the crevices of the fractured portion.

Also, it is to be noted in the operation of the method of FIGURE 5, that the diagrammatic view as is shown of pressure fluid chamber 30, represents deformable strata 18 as having its lower interface 24 resting upon a substantially non-deformable strata. Should the strata below chamber 30 be deformable, then deformation of chamber 30 would occur down into this lower strata, as shown by the dotted line below chamber 30. This same condition would occur as to upper pressure fluid chamber 72 as seen by the dotted lines.

Figure 6:
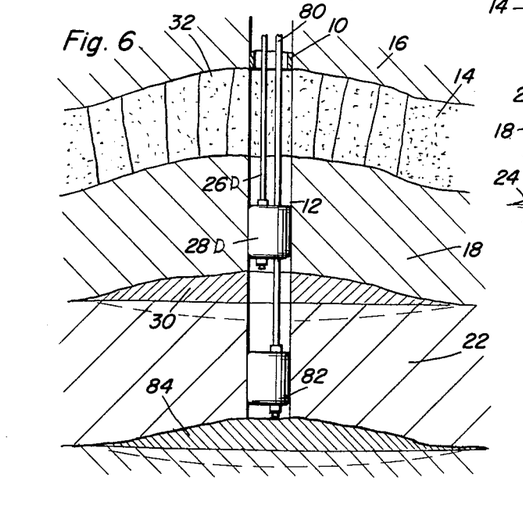
FIGURE 6 is a view similar to FIGURE 1 but showing the manner in which successive fracturing forces may be applied to a formation for producing modified characteristics of fracture in the formation.

*Method of FIGURE 6*

FIGURE 6 discloses a still further manner of applying the principles of this invention. Shown therein is the method of fracturing a strata in accordance with FIGURE 1. The same numerals refer to the same elements as in FIGURE 1. Extending through a dual packer 28D in a well bore 12 which extends to the bottom of the second underlying deformable strata 22, is a second string of piping 80 which extends through a packer 82 at its lower end and which packer is disposed at the bottom of the strata 22. When the operation of FIGURE 1 has been completed in the arrangement shown in FIGURE 6, pressure fluid is supplied through the piping 80 below the packer 82 and to the interface below the second deformable strata 22. This produces a hydraulic or pressure chamber 84 which upwardly deforms the overlying portion of the strata 22 and causes this upper portion of the same to bear against the lower portion of the previously deformed and upwardly pressed strata 18. In this operation, the fluid pressure previously applied through piping 26D from beneath the packer 28D to the lower side of the strata 18 may be either retained in place, or, if desired, may be released. In any event, the upward deforming of the strata 22 serves to impart an additional local upward thrust against the lower side of the previously fractured portion 32 of the strata 14, producing local upward thrusts on the same, increasing the fracturing action to which the strata was previously subjected as well as extending the same.

In some instances, where the pressure fluid has been retained in the interface between the strata 18 and 22, the further upward thrust imposed by the strata 22 by means of the pressure chamber 84, will serve to cause an outward expansion of the pressure fluid between the strata 18 and 22, thereby extending the region of fracturing radially from the well bore 12. The fractures in FIGURE 6 have been diagrammatically illustrated by single lines.

It is observed that the method of FIGURE 6 may thus be used to augment or modify and to some extent to direct the application of the upward force and the shattering action applied to the strata 14.

As a further explanation of the aparation of the method shown in this FIGURE 6, it will be noted that the two pressure fluid chambers 30 and 84 are located adjacent to the same well bore and are pressured by pressure fluid through the same well bore 12. This is entirely unlike the directional fracturing control shown in FIGURE 4, which requires the use of two or more well bores, and wherein one well bore is used to pressure the deformable strata to prevent migration of the pressure fluid from another well bore from causing operational fracturing pressure upon said area pressured by said first well bore. Whereas, in the operation of the method shown in FIGURE 6, the pressure fluid chamber 30 is spread out in a substantially equal pressured area surrounding well bore 12, and the creation and extension of pressure fluid chamber 84 by pressure fluid also applied through well bore 12, serves to exert its pressure in substantially the center of the upper existing pressure fluid chamber 30, thereby either increasing the pressure exerted by said chamber 30 or serving to press the pressure fluid contained in chamber outwardly in a bulging pressure ring, which serves to further extend the area fractured of the brittle frangible strata 14.

In the diagrammatic drawing of FIGURE 6 the bottom part of pressure fluid chamber 84 is shown as being substantially non-deformed. This would be the case if the strata existing below deformable strata 22 were of a non-deformable character. Where this lower strata below strata 22 was of a deformable nature, then pressure fluid chamber 84 would cause some deformation in this lower strata, as shown by the dotted line below chamber 84. Also, there would be some deformation downwardly into deformable strata 22 from the pressure fluid chamber 30, as shown by the dotted line below chamber 30, which however would tend to assume its original level, from the pressure exerted by lower chamber 84.

It is to be particularly noted that the feature of the invention disclosed in connection with FIGURE 6 can be employed in conjunction with the other features of the invention set forth in this application.

Figure 7:
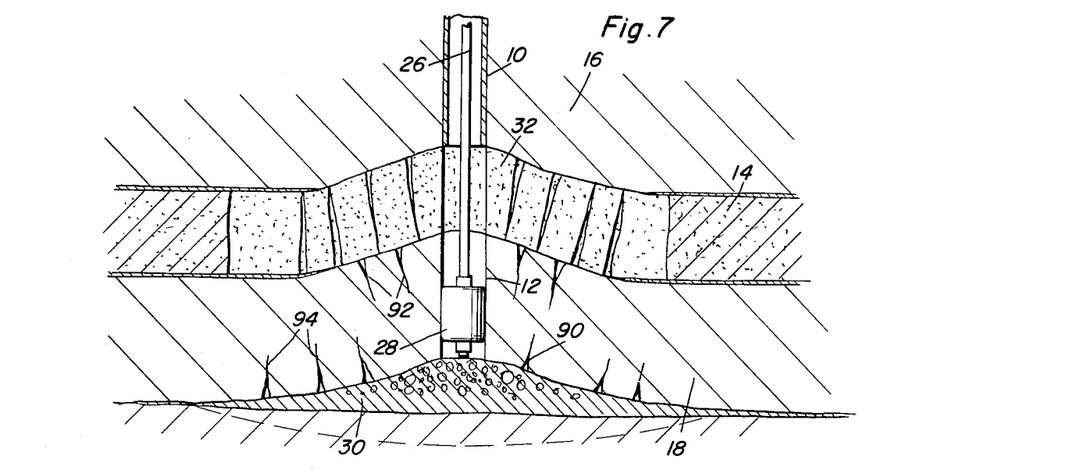
FIGURE 7 is a view similar to FIGURE 1 indicating a further adaptation of the methods of this invention wherein a formation below a fluid bearing formation to be fractured may be also fractured to constitute a drainage for the producing formation.
Figure 8:
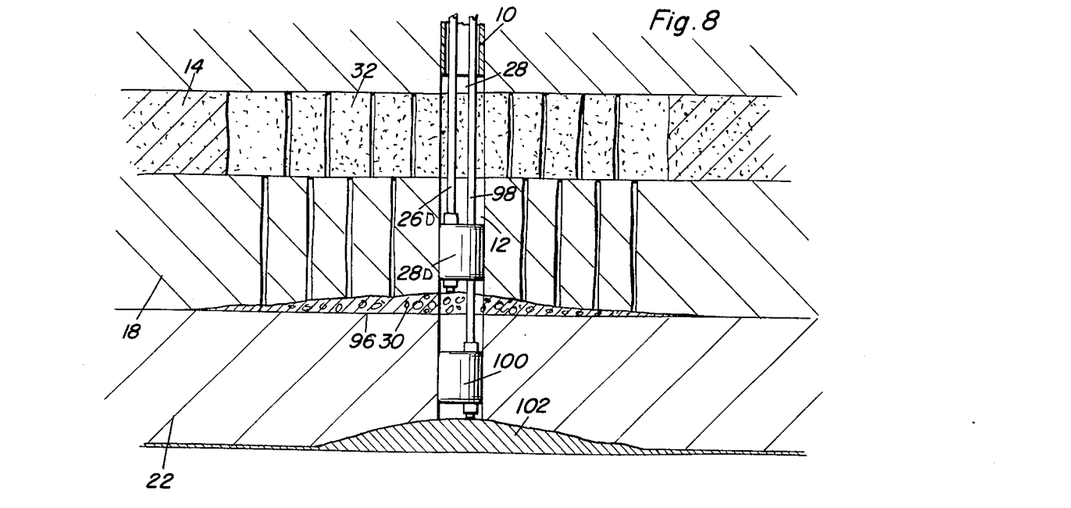
FIGURE 8 is a view similar to FIGURE 7 and illustrating a further state of a method therein in which the underlying formation has also been fractured to constitute a fluid drainage and collecting zone for the recovery of fluids from the fractured overlying fluid producing formation.

*Method of FIGURES 7 and 8*

In the preceding applications of the methods of this invention, it has been assumed that the fluids released by shattering or rupturing of the strata 14 were recovered directly from that strata. In some instances, however, it may be preferred as where there is an unavoidable loss of fluid downwardly from the ruptured portion 32 of the strata 14, into the lower deformable strata 18, to drain and recover this fluid from beneath the strata 18. For this purpose, the method disclosed in FIGURES 7 and 8 is believed to be especially effective.

In practicing this method, the method in accordance with FIGURE 1 may first be applied to deform and uplift the strata 18 which causes fracturing of the portion 32 of the strata 14, as shown in FIGURE 7. In actual practice of this method the dual packer 28D would be used along with the packer 100, all as illustrated in FIGURE 8.

Moreover, as the previously mentioned pressure chamber 30 is supplied with pressure fluid through the piping 26D, producing an upwardly deformed and uplifted portion of the deformable strata 18 and where lower strata 22 is of sufficient deformability there is some downward deforming into strata 22 as shown by dotted line below chamber 30, gravel or sand may be fed with the pressure fluid into the chamber 30. It is evident that although the strata 18 will deform or bend to a considerable extent before fracture will occur, that the deforming operation may be continued until such fractures will eventuate. In FIGURE 7, it is assumed that the application of pressure has continued until the deformable strata 18 begins to have fractures or cracks 92 extending downwardly from its upper surface and 94 extending upwardly from its lower surface. In FIGURE 7 these fissures or cracks have not extended entirely through the vertical extent of the strata.

There is also provided a second string of piping 98 which extends past the packer 28D and through a lower packer 100 disposed at the bottom of the lower deformable strata 22. Pressure fluid from piping 98 may be discharged into a pressure chamber 102 beneath the strata 22 and into the interface 24 therebeneath whereby to lift the strata 22, as shown in FIGURE 8, and thereby exert a fracturing pressure on the upper deformable strata 18, resulting eventually in complete fracture of the latter. Thus, the strata 14 and 18 may be fractured and retained in an uplifted position and the pressure of the chamber 30 may be released, thereby permitting the liquids of the productive strata 14 to collect by gravity and/or the gas pressure in the upper portion of the strata 14 into the strata 18 for recovery through the well bore 12.

When desired, the pressure of the chamber 30 and/or the chamber 102 below the packer 100 may be released and the fractured strata 14 and/or 18 allowed to descend, as shown in FIGURE 8.

The application of pressure to the chamber 30 may be continued until the fissures 92 and 94 extend completely through the strata 18. Alternately, it may be discontinued in substantially the position or stage of operation shown in FIGURE 7, and with the fractures extending vertically either wholly or partially through the strata 18, the pressure may be released permitting the productive strata 14 and the deformable strata 18 to settle substantially into their original position, as shown in FIGURE 8. In this position, it will be observed that the portion 32 of the strata 14 has been completely fractured, and further, that the underlying portion of the strata 18 has been completely shattered. The graveled region 96 beneath the fractured portion of the deformable strata 18 serves to permit drainage of fluids from the productive strata 14 and the shattered strata 18 to the well bore 12 from whence they may be recovered in the usual manner.

It is an important feature of this invention that the methods hereinbefore set forth may be employed without interference with other conventional methods employed during the production and treatment of wells. Thus, any of the conventional methods of sealing formations against the loss of fluid thereinto may be employed, while underwater wells may be completed or their flow stimulated through the application of the method of this invention thereto. Still further, it is evident that treatments in accordance with the above mentioned applications of this invention may be easily repeated, as desired, from time to time.

The previously mentioned features of sanding, graveling, sealing, or temporary plugging the fractures may likewise be employed with this or any of the features of the invention.

Further, the chamber 102 may be employed to extend the area of the fractured portion 32 while fluid is being recovered therefrom through the fractured strata 18. In this mode of operation, the pressure fluid is drained from the chamber 30 since the strata 18 now constitutes merely a supporting and drainage means for the fractured strata 14.

In contrast to previous known methods wherein fracturing of a productive strata necessarily was halted during the production of liquid therefrom, this feature of the invention enables the fracturing process to be freely continued without interfering with the continuing production of the strata.

An interesting and important feature of this invention is that the friction between the sand particles produced by their relative movement during the displacement of the strata as above set forth, will generate heat, the latter assisting in the flow of fluids in the producing strata and their recovery therefrom.

The foregoing is considered as illustrative only of the principles of the invention. Further, since numerous modifications and changes will readily occur to those skilled in the art, it is not desired to limit the invention to the exact construction and operation shown and described, and, accordingly all suitable modifications and equivalents may be resorted to, falling within the scope of the appended claims.

What is claimed:

1. The method of fracturing an oil and gas production stratum in a geological formation including a quartz type relatively brittle production stratum, a deformable stratum having an ultimate strength greater than the ultimate strength of the brittle stratum and interfaces contacting opposite sides of said deformable stratum one interface of which is in contact with said production stratum the other interface remote therefrom, said geological formation having an oil well bore extending therethrough; which includes the steps of isolating said production stratum from the interface remote from said production stratum, injecting a fluid through said well bore into the interface contacting said deformable stratum but remote from said production stratum with the fluid under a pressure sufficient to apply force to said deformable stratum less than its ultimate strength but sufficient to move the boundary of said deformable stratum adjacent said production stratum into pressure applying relation to said production stratum, the movement of the deformable stratum applying a force to the production stratum in excess of the ultimate strength of the production stratum to thereby fracture the production stratum.

2. A method as set forth in claim 1 which includes the step of releasing the fluid pressure deforming said deformable stratum to permit said deformable stratum and said production stratum to return toward their original positions.

3. A method as set forth in claim 1 which includes the step of producing oil and gas from said oil and gas production stratum while said deformable stratum is in deformed position.

4. A method as set forth in claim 1 which includes the steps of introducing solid particles through said well bore into the fracture crevices created in said production stratum with said production stratum under pressure from said deformable stratum and releasing the fluid pressure deforming said deformable stratum to permit at least partial return of said production stratum toward its original position to effect an increase in the size of the fracture crevices therein.

5. A method of fracturing a subterranean petroliferous producing formation penetrated by a well bore, said formation relatively brittle and contiguous to a non-producing deformable stratum, comprising packing off said well bore to isolate and confine a portion of said deformable stratum from said producing formation, and supplying fluid under sufficient pressure through said well bore to said confined portion to cause fracturing of said brittle formation.

6. A method according to claim 5 which includes the additional steps of forcing solid particles into said fractures of said brittle formation simultaneous with said application of pressure and thereafter decreasing said pressure to permit at least partial recovery of the position of said fractured portion and effect an increase in the size of the fracture therein.

7. The method according to claim 6 wherein said solid particles comprise a propping agent.

8. The method according to claim 6 wherein said solid particles comprise a sealing agent.

9. The method according to claim 6 wherein said solid particles are forced into the fractures at a place in the formation furtherest removed from the plane of said deformable stratum.

10. A method of controllably fracturing a productive relatively brittle subterranean geological formation penetrated by a well bore and wherein superposed first and second adjacent deformable strata underlie said brittle formation, comprising packing off said well bore adjacent the faces of said deformable strata to isolate and confine said deformable strata from each other and from said productive formation, separately supplying fluid under pressure through said well bore to the confined faces of said first and second strata, increasing the pressure of said fluid to the underside of said first deformable stratum and thereby arch and fracture said brittle formation, and increasing the pressure of said fluid to the underside of said second deformable stratum to restrict flow of said pressure fluid to said first deformable stratum and thereby control the radial extent of the fractures in said brittle formation.

11. A method of controllably fracturing a productive relatively brittle subterranean geological formation penetrated by a well bore and wherein superposed first and second adjacent deformable strata overlie said brittle formation, comprising packing off said well bore adjacent the faces of said deformable strata to isolate and confine said deformable strata from each other and from said productive formation, separately supplying fluid under pressure through said well bore to the confined faces of said first and second strata, increasing the pressure of said fluid to the topside of said first deformable stratum and thereby arch and fracture said brittle formation, and increasing the pressure of said fluid to the topside of said second deformable stratum to restrict flow of said pressure fluid to said first deformable stratum and thereby control the radial extent of the fractures in said brittle formation.

12. A method of controllably fracturing a productive relatively brittle subterranean geological formation wherein superposed first and second adjacent deformable strata underlie said brittle formation and all are penetrated by at least two offset well bores, compirsing packing off one of said well bores adjacent the face of said first stratum to isolate and confine said stratum from said producing formation, packing off the other of said well bores adjacent the face of said second stratum to isolate and confine said stratum from said first stratum and said producing formation, supplying a fluid under pressure to the underside of said confined portion of said first deformable stratum in one well bore to thereby arch said deformable stratum and fracture said brittle formation, and supplying a fluid under pressure to the underside of said confined portion of said second deformable stratum in the other well bore at a pressure below that necessary to fracture said brittle formation yet sufficient to control the extent of the arch of said first deformable stratum and thereby control the region of said fractures.

13. A method of controllably fracturing a productive relatively brittle subterranean geological formation wherein superposed first and second adjacent deformable strata overlie said brittle formation and all are penetrated by at least two offset well bores, comprising packing off one of said well bores adjacent the face of said first stratum to isolate and confine said stratum from said producing formation, packing off the other of said well bores adjacent the face of said second stratum to isolate and confine said stratum from said first stratum and said producing formation, supplying a fluid under pressure to the topside of said confined portion of first deformable stratum in one well bore and thereby arch said stratum and fracture said brittle formation, and supplying a fluid under pressure to the topside of said confined portion of said second deformable stratum in the other well bore at a pressure below that necessary to fracture said brittle formation yet sufficient to control the extent of the arch of said first stratum and thereby control the region of said fractures.

14. A method of fracturing a productive relatively brittle subterranean formation having deformable strata above and below said formation and penetrated by a well bore, comprising packing off said well bore adjacent the face of each deformable stratum to confine said deformable strata from said productive formation, supplying pressure fluid through said well bore to the face of each of said stratum, and alternately applying and releasing the pressure of said fluid to said stratum above and then to said stratum below said formation to cause fracturing of said formation.

15. A method of fracturing an oil and gas productive formation penetrated by a well bore, said formation contiguous to a first deformable stratum bordering said formation, and a second deformable stratum bordering said first deformable stratum, said deformable strata having an ultimate strength greater than the ultimate strength of said productive formation, comprising the steps of:

(a) packing off said well bore adjacent the face of each of said first and said second deformable strata to confine a portion of each of said deformable strata from each other and said producing formation, (b) supplying pressure fluid through said well bore separately to each of said confined portions, (c) supplying force to said pressure fluid against said first deformable stratum at a pressure less than the ultimate strength of said deformable stratum but sufficient to move said first deformable stratum to apply a force against said productive formation in excess of its ultimate strength whereby said formation is fractured, (d) continuing (c) until sufficient force is applied to said first deformable stratum to initiate fractures therein, and (e) applying force to said pressure fluid against said second deformable stratum at a pressure less than its ultimate strength but sufficient to move said second stratum against said first stratum and continue fracturing said first stratum whereby fluids from said productive formation will gravitate therethrough and into said well bore.

References Cited by the Examiner

UNITED STATES PATENTS

| 2,547,778 | 4/1951 | Reistle | 166—42.1 |
| 2,703,619 | 3/1955 | Sutherlin | 166—42.1 |
| 2,788,072 | 4/1957 | Goodwin | 166—42.1 |
| 2,838,117 | 6/1958 | Clark et al. | 166—42.1 |

FOREIGN PATENTS 654,454  12/1962  Canada.

CHARLES E. O'CONNELL, *Primary Examiner.*